C. H. MATTICE.
PULLEY.
APPLICATION FILED MAY 27, 1911.

1,011,468.

Patented Dec. 12, 1911.

Witnesses:

Inventor
Charles H. Mattice
By
Attorney

UNITED STATES PATENT OFFICE.

CHARLES H. MATTICE, OF TROY, NEW YORK, ASSIGNOR TO ADAMS LAUNDRY MACHINERY COMPANY, OF TROY, NEW YORK, A CORPORATION OF NEW YORK.

PULLEY.

1,011,468.      Specification of Letters Patent.      Patented Dec. 12, 1911.

Application filed May 27, 1911. Serial No. 629,923.

*To all whom it may concern:*

Be it known that I, CHARLES H. MATTICE, a citizen of the United States, and resident of 1938 Fifth avenue, in the city of Troy, Rensselaer county, New York, have invented certain new and useful Improvements in Pulleys, of which the following is a specification.

My invention relates to pulleys, consisting ordinarily of at least two parts, one of which rotates freely on, while the other is secured to, a shaft. Such pulleys are advantageously used where considerable initial inertia, as in starting a heavy machine or in lifting a weight, is to be overcome, without the expenditure of greater power than is afterward required to continue the operation.

The object of my invention is to produce a simple, economical, durable, easily repaired and highly efficient pulley of this general description.

Further objects of the invention, as well as the means for obtaining the same, will appear in this specification, and be pointed out in the claims.

Figure 1:
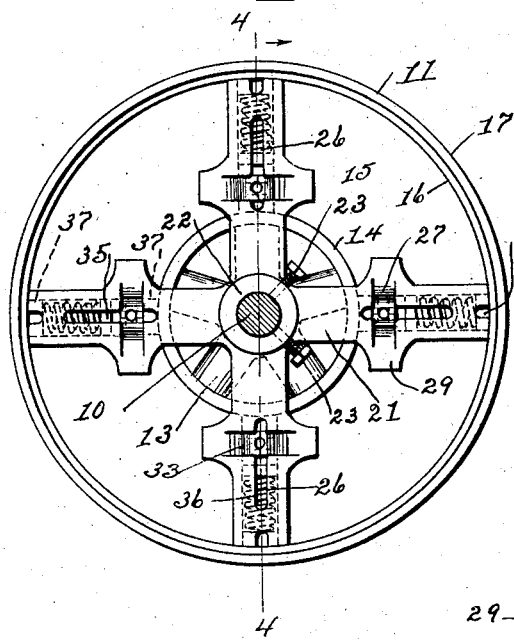
Figure 2:
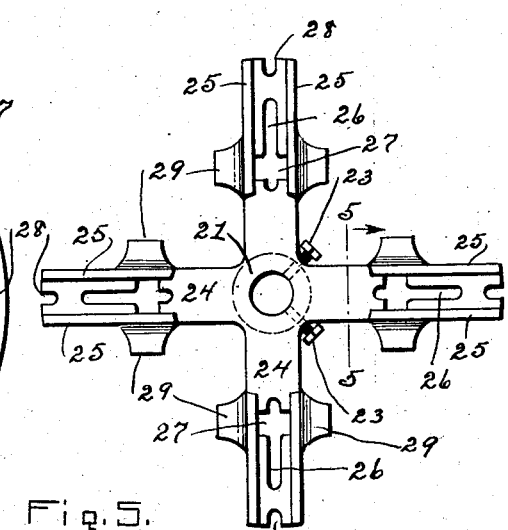
Figure 3:
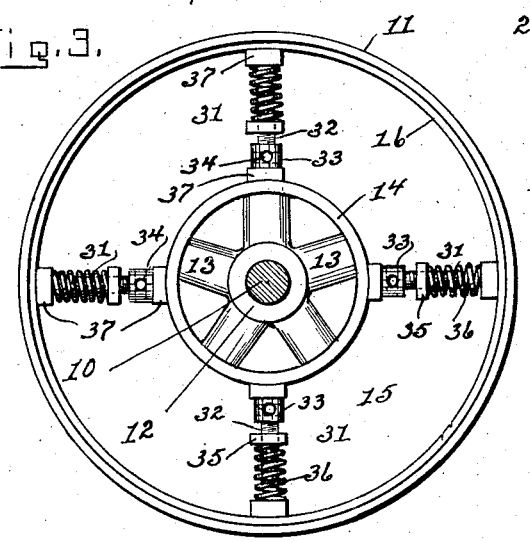
Figure 4:
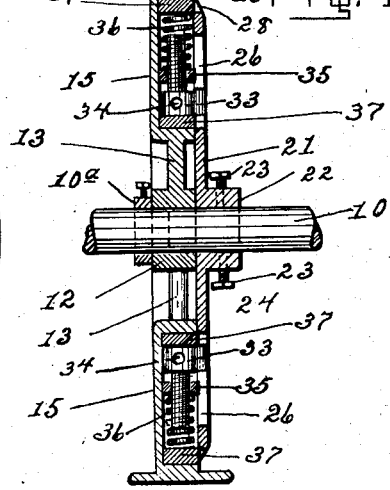

In the drawings, which represent a preferred embodiment of my invention, Figure 1 is a side elevation of my device; Fig. 2 is an elevation of the "fast" portion of the pulley, the face shown being the opposite of that shown in Fig. 1; Fig. 3 is an elevation of the "loose" portion of the pulley with the friction devices inserted therein; Fig. 4 is a vertical section taken on the plane 4—4, Fig. 1; Fig. 5 is a section on the plane, 5—5, Fig. 2.

10 designates a line or machine shaft, on which the pulley is mounted.

11 is the loose portion of the pulley, having a hub 12 running freely on the shaft 10, and held from longitudinal movement thereon as by a set collar 10ᵃ. As shown, the portion 11 is formed with short arms 13, a concentric flange 14, an annular web 15, and an exterior concentric flange 16, which may, as in the present instance, be integral with the face 17. It will be noted that the flanges 14 and 16, with the web 15, form an annular dish or depression, the function of which will hereafter appear.

21 is the fast portion of the pulley, which may vary greatly in shape, but which is shown as a spider having a hub 22, provided with set screws 23 for engagement with the shaft 10, and a plurality, shown as four, of similar arms 24 extending radially from the hub 22. On the proximate face of the portion 21, each arm 24 has two parallel flanges 25, the length and position of which are such as to enable them to freely pass between the concentric flanges 14 and 16 of the loose portion 11. Through the web of each arm 24, between the flanges 25 is cut a radial slot 26, widened at 27 to extend substantially from flange to flange. At the end of the web is a notch 28. Strengthening wings 29 are formed at each side of the aperture 27, which aperture is widened at the rear face of the arm, for a purpose which will be explained.

31 is a friction block or arm, of which four are shown, detachably interposed between the concentric flanges 14 and 16 of the loose portion 11 of the pulley. In the form shown, the block comprises a bolt 32, having a cylindric head 33, pierced with cross apertures 34; a squared or otherwise polygonal nut 35, a stiff coiled spring 36 bearing against the nut 35; and two wearing blocks 37, preferably of fiber or like material, between which the other parts are placed, see Fig. 3.

The assembling of the parts, and the operation of the device will be clearly understood from an inspection of the drawings. Either before or after the loose portion 11 is put on the shaft 10, the friction blocks 31 are arranged therein as shown in Fig. 3, with one of the wearing blocks 37 against each of the flanges 14 and 16, the spring 36 slipped over the end of the bolt 32 beyond the nut 35, the bolt and spring placed radially between the two blocks 37 with the head 33 inward, and the bolt turned sufficiently to hold the device in place. The portion 11 is then set in place on the shaft and the collar 10ᵃ secured thereon. The fast portion 21 of the pulley is then moved against the portion 11, with each pair of flanges 25 embracing one of the friction blocks 31, and the set screws 23 screwed home on the shaft 10. The bolts 32 are then turned so as to provide sufficient friction between the wearing blocks 37 and the flanges 14 and 16, against which they bear. This is done by means of a pin inserted in the apertures 34, the rear widening 27 of the slots 26 in the arms 21 permitting a full quarter turn being given to the bolt. As shown in Fig. 1, the slot 26 and the notch 28 in each arm 21 permit an inspection of all parts of the friction block, without disturbing any of the portions of the device; while the aperture 27 provides for an alteration of the frictional resistance at any time, either in accordance with a change of load, or to compensate for wear of the fiber blocks 37.

It will of course be understood that, when the load is suddenly thrown on the portion 11 of the pulley, the friction blocks 31 will slip circumferentially between the flanges 14 and 16 until the initial inertia is partially or wholly overcome, after which the pulley will travel as a unit; and that, if the shaft 10 is stopped, any moving inertia of the load will be cared for, without undue strain on the belt, by a slip of the portion 11 in the opposite direction. It is clear that the number of friction producing parts, as well as their particular construction, is non-essential to my invention; although it is advantageous that they be so arranged as to make the pulley self-balancing. In the form of construction described, it will further be observed of the fast and loose portions of the pulley that the friction block (or blocks) has frictional contact solely with one of them, while the other acts to hold the block in rotary relation therewith.

As already suggested, many mechanical changes may be made in the form of my device without departing from the spirit of my invention.

What I claim is:

1. A pulley comprising a loose portion having two concentric flanges; a resilient friction block radially disposed between said flanges; and means fast on the shaft for holding said block in position and for causing its rotation with the shaft, substantially for the purposes set forth.

2. A pulley comprising a loose portion having two concentric flanges; an extensible, resilient friction block radially disposed between said flanges; and means fast on the shaft for holding said block in position and for causing its rotation with the shaft, substantially for the purposes set forth.

3. A pulley comprising a loose portion having two concentric flanges; a resilient friction block radially disposed between said flanges; and means fast on the shaft, including parallel flanges embracing said block, for holding it in position and for causing its rotation with the shaft, substantially for the purposes set forth.

4. A pulley comprising a loose portion having two concentric flanges; an extensible, resilient friction block radially disposed between said flanges; means fast on the shaft for holding said block in position and for causing its rotation with the shaft; said block being provided with means for longitudinally adjusting it while the parts are in operative position, substantially for the purposes set forth.

5. A pulley comprising a loose portion having two concentric flanges; an extensible, resilient friction block, including a bolt and a nut, radially disposed between said flanges; and means fast on the shaft, including a radial arm formed with flanges for embracing said block and with an aperture between said flanges for permitting access to said bolt, for holding said block in position and for causing its rotation with the shaft, substantially for the purposes set forth.

6. A pulley comprising a loose portion having two concentric flanges; an extensible, resilient friction block, including two wearing blocks and a bolt, a nut and a spring interposed between said wearing blocks, radially disposed between said flanges; and means fast on the shaft, including a radial arm formed with flanges for embracing said friction block and with apertures between said flanges for permitting access to said bolt and observation of said wearing blocks, for holding said block in position and for causing its rotation with the shaft, substantially for the purposes set forth.

7. A pulley comprising a loose portion having two concentric flanges; a fast portion formed with pairs of parallel flanges; and a plurality of resilient friction blocks radially disposed between said concentric flanges and each laterally supported between one of said pairs of parallel flanges, substantially for the purposes set forth.

8. A pulley comprising a loose portion having two concentric flanges; a fast spider-shaped portion having arms formed with pairs of parallel flanges; and a plurality of friction blocks, each having a detachable wearing block at each of its ends, radially disposed between said concentric flanges and each laterally supported between one of said pairs of parallel flanges, substantially for the purposes set forth.

9. A pulley comprising two portions, one of which is fast and the other loose on the shaft; one of said portions being provided with concentric flanges; a friction block radially disposed between said flanges; the other of said portions being provided with means for holding said block in positive rotary relation therewith.

CHARLES H. MATTICE.

Witnesses:
  Geo. L. Cooper,
  John T. Birge.

---

Copies of this patent may be obtained for five cents each, by addressing the "Commissioner of Patents, Washington, D. C."